(12) United States Patent
Capito

(10) Patent No.: US 7,445,575 B2
(45) Date of Patent: Nov. 4, 2008

(54) POSITIVE CLUTCH WITH STAGGERED TEETH HEIGHT

(75) Inventor: Russell T Capito, Clarkston, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 246 days.

(21) Appl. No.: 11/602,727

(22) Filed: Nov. 21, 2006

(65) Prior Publication Data

US 2007/0066439 A1 Mar. 22, 2007

Related U.S. Application Data

(62) Division of application No. 10/912,776, filed on Aug. 4, 2004, now abandoned.

(51) Int. Cl.
*F16H 37/08* (2006.01)
(52) U.S. Cl. .................................. 475/204
(58) Field of Classification Search ............. 192/69.82, 192/69.83, 108
See application file for complete search history.

(56) References Cited

U.S. PATENT DOCUMENTS

| | | | | |
|---|---|---|---|---|
| 732,943 | A | 7/1903 | Jenatzy | ............ 192/84.21 |
| 831,433 | A * | 9/1906 | Hendrickson | ............... 192/108 |
| 1,163,085 | A | 12/1915 | Hardy | ............. 192/108 |
| 2,049,126 | A | 7/1936 | Maybach | ............ 192/69.83 |
| 2,049,127 | A | 7/1936 | Maybach | |
| 2,384,582 | A | 9/1945 | Wildhaber | |
| 2,384,583 | A | 9/1945 | Wildhaber | |
| 2,384,584 | A | 9/1945 | Wildhaber | |
| 2,388,456 | A | 11/1945 | Wildhaber | |
| 2,398,570 | A | 4/1946 | Wildhaber | |
| 2,405,698 | A | 8/1946 | Jameson | |
| 2,443,089 | A | 6/1948 | Wildhaber | |
| 2,558,203 | A | 6/1951 | Wildhaber | |
| 2,613,781 | A | 10/1952 | Polomski et al. | |
| 2,654,456 | A | 10/1953 | Wildhaber | |
| 2,667,252 | A | 1/1954 | Meyer | |
| 2,787,355 | A | 4/1957 | Dodge | |
| 2,950,797 | A | 8/1960 | Zieher | |
| 2,969,134 | A | 1/1961 | Wiedmann et al. | |
| 3,303,915 | A | 2/1967 | Oesterle | |
| 3,370,486 | A * | 2/1968 | Lamburn | ............ 475/136 |
| 3,424,289 | A | 1/1969 | Bessot | |
| 3,880,267 | A | 4/1975 | Auble et al. | |
| 3,967,711 | A | 7/1976 | Stroezel et al. | |
| 4,060,007 | A | 11/1977 | Levesque | |
| 4,669,559 | A | 6/1987 | Fukui | |
| 4,677,875 | A * | 7/1987 | Batchelor | ............ 475/85 |
| 4,727,968 | A | 3/1988 | Chana | |

(Continued)

FOREIGN PATENT DOCUMENTS

GB 2081822 A 2/1982

(Continued)

*Primary Examiner*—Dirk Wright
(74) *Attorney, Agent, or Firm*—Harness, Dickey & Pierce, P.L.C.

(57) ABSTRACT

A drive train having an axle assembly with a differential and a multi-speed transmission outputs rotary power to an input pinion of the differential. The multi-speed transmission includes a positive or dog clutch with teeth having staggered heights. The staggered tooth height configuration provides a larger effective engagement area with less tooth lash.

15 Claims, 9 Drawing Sheets

U.S. PATENT DOCUMENTS

| | | |
|---|---|---|
| 4,781,265 A | 11/1988 | Weiler et al. |
| 4,805,485 A | 2/1989 | Ida |
| 4,905,806 A | 3/1990 | Hillenbrand et al. |
| 5,045,036 A | 9/1991 | Reuter et al. |
| 5,052,535 A | 10/1991 | Vandervoort et al. |
| 5,172,573 A | 12/1992 | Sharp et al. |
| 5,524,738 A | 6/1996 | Erlebach et al. .......... 192/69.83 |
| 6,015,361 A | 1/2000 | Yamazaki et al. ........... 475/230 |
| 6,066,062 A * | 5/2000 | Pigozzi ....................... 475/207 |
| 6,112,873 A | 9/2000 | Prasse et al. |
| 6,354,417 B1 * | 3/2002 | Narita et al. ............. 192/69.71 |
| 6,513,615 B2 | 2/2003 | Bowen et al. |
| 6,523,637 B1 | 2/2003 | Nakano et al. |
| 6,605,018 B2 | 8/2003 | Palazzolo |
| 6,620,071 B1 | 9/2003 | Cook et al. |
| 6,626,787 B2 * | 9/2003 | Porter ........................ 475/221 |
| 6,755,762 B2 * | 6/2004 | Gradu ........................ 475/150 |

FOREIGN PATENT DOCUMENTS

| | | |
|---|---|---|
| JP | 59073627 A | 4/1984 |

\* cited by examiner

US 7,445,575 B2

POSITIVE CLUTCH WITH STAGGERED TEETH HEIGHT

CROSS-REFERENCE TO RELATED APPLICATIONS

This application is a divisional of U.S. patent application Ser. No. 10/912,776 filed Aug. 4, 2004 now abandoned entitled "Positive Clutch With Staggered Teeth Height", the disclosure of which is hereby incorporated by reference as if fully set forth in detail herein.

FIELD

The present invention relates to a vehicle drive train and more specifically to a vehicle drive train having an axle assembly with a two-speed planetary input that employs a positive clutch with staggered teeth height.

BACKGROUND

With reference to FIGS. 1, 2 and 3, portions of a conventional positive clutch are shown and generally indicated by reference 10. The positive clutch 10 includes a first clutch ring 12 and a second clutch ring 14. A first plurality of teeth 16 is located on the first clutch ring 12 and a second plurality of teeth 18 is located on the second clutch ring 14. When the positive clutch 10 is engaged, the first plurality of teeth 16 and the second plurality of teeth 18 mesh together such that the first clutch ring 12 and the second clutch ring 14 are connected and can no longer rotate relative to one another. Unlike an exemplary friction clutch (not shown), the positive clutch 10 does not slip when engaged.

In most instances, the first clutch ring 12 is out of rotational alignment with the second clutch ring 14, so the first clutch ring 12 or the second clutch ring 14 must rotate relative to one another to align the first plurality of teeth 16 with the second plurality of teeth 18. More specifically, the first clutch ring 12 includes spaces 20 between the first plurality of teeth 16. Like the first clutch ring 12, the second clutch ring 14 also includes spaces 22 between the second plurality of teeth 18. As shown in FIG. 3, alignment and engagement of the positive clutch 10 requires that the first plurality of teeth 16 moves into the spaces 22 of the second clutch ring 14. Similarly, the second plurality of teeth 18 needs to move into the spaces 20 of the first clutch ring 12. To facilitate alignment and engagement of the positive clutch 10, the spaces 20, 22 are larger than the plurality of teeth 16, 18. The larger the spaces 20, 22, (relative to the teeth 16, 18 respectively) the easier it is to engage the clutch 10. Relatively large spaces between the teeth of the positive clutch 10, however, generally result in increased noise and vibration.

With reference to FIG. 2, it will be appreciated that the geometry of the clutch rings 12, 14 lend themselves to be discussed in radial coordinates. As such, each tooth of the plurality of teeth 16, 18 can occupy a certain amount of circumferential spacing on the clutch rings 12, 14. More specifically, each tooth, for example, can occupy a circumferential space of about twenty-eight (28) degrees (indicated by reference numeral 24) while the spaces 20, 22 therebetween (indicated by reference numeral 26) can occupy a circumferential space of about thirty-two (32) degrees. With this arrangement, there are six teeth with four degrees of clearance or lash between each tooth as shown in FIG. 2.

As noted above, it is easier to mesh the positive clutch 10 when there is more lash present, when compared to a similar positive clutch with less lash. More lash, however, causes the positive clutch 10 to produce noise and vibration due to the abundance of spacing between the teeth causing motion and clatter therebetween. To reduce noise and vibration, lash between teeth can be reduced. The reduction of lash, however, can also create additional noise and vibration due to the inability of the positive clutch to engage because each clutch ring 12, 14 of the positive clutch 10 will continue to rotate against one another and create noise and vibration until the positive clutch 10 engages.

SUMMARY

In one form, the present teachings provide a drive train for a vehicle. The drive train includes an axle and a drive unit. The axle includes a differential with an input pinion. The drive unit includes a housing, an intermediate shaft, a planetary transmission and a clutch. The housing defines a cavity in which the intermediate shaft, the planetary transmission and the clutch are disposed. The intermediate shaft is configured to be coupled to a prop shaft. The planetary transmission couples the intermediate shaft and the input pinion. The clutch includes a plurality of clutch rings. At least one of the clutch rings has a first set of teeth and a second set of teeth that are shorter than the first set of teeth. The clutch can be operated in a first mode, wherein a first pair of the clutch rings is engaged to one another to couple the intermediate shaft and the input pinion for rotation with one another. The clutch can also be operated in a second mode wherein a second pair of the clutch rings is engaged to one another to provide the speed reduction between the intermediate shaft and the input pinion.

Further areas of applicability of the present invention will become apparent from the detailed description provided hereinafter. It should be understood that the detailed description and specific examples, while indicating the various embodiments of the invention, are intended for purposes of illustration only and are not intended to limit the scope of the invention.

BRIEF DESCRIPTION OF THE DRAWINGS

The present invention will become more fully understood from the detailed description, the appended claims and the accompanying drawings, wherein:

DETAILED DESCRIPTION OF THE VARIOUS EMBODIMENTS

The following description of the various embodiments is merely exemplary in nature and is in no way intended to limit the invention, its application, or uses.

Figure 4:
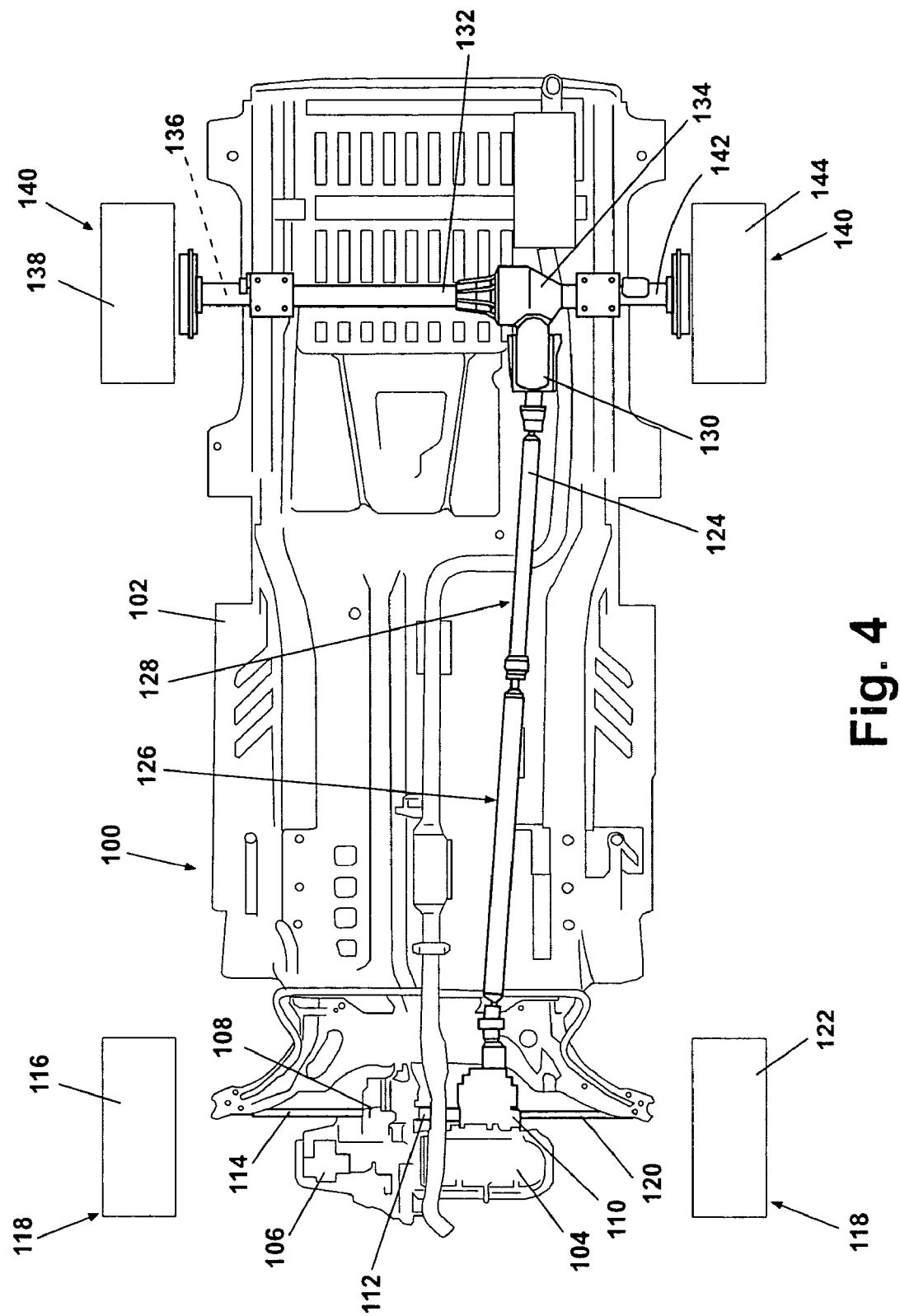
FIG. 4 is a partial plan view of an underside of a vehicle having a two speed all wheel drive system constructed in accordance with the teachings of the present invention.

With reference to FIG. 4, an exemplary two speed all wheel drive system 100 is shown viewed from an under surface of a vehicle 102. The vehicle 102 includes an engine 104, a transmission 106 and a drive train that can include a center differential 108 and a power take off unit (PTU) 110. A PTU input shaft 112 can connect the center differential 108 to the PTU 110. A left half shaft 114 can rotatably couple to the center differential 108, providing a drive torque to a left front wheel 116 of a front wheel set 118. A right half shaft 120 can rotatably connect through the PTU 110 to the center differential 108 and provide the drive torque to a right front wheel 122. The right front wheel 122 and the left front wheel 116 both form the front wheel set 118.

The drive torque can be distributed from the PTU 110 through a prop shaft 124 that can have a first shaft portion 126 and a second shaft portion 128, respectively, to a drive unit 130. The drive unit 130 can be directly mounted to a rear axle 132 of the vehicle 102. The rear axle 132 can include a differential 134 and a left rear axle shaft 136, which is coupled to the differential 134 and which transmits rotational torque to a left rear wheel 138 of a rear wheel set 140. The rear axle 132 also includes a right rear axle shaft 142, which can be coupled to the differential 134 and transmits drive torque to a right rear wheel 144. Both the right rear wheel 144 and the left rear wheel 138 combine to form the rear wheel set 140. A more detailed description of the vehicle 102 and the various components of the power train including further detail of the PTU 110 and the center differential is disclosed in commonly assigned U.S. patent application titled Two-Speed All Wheel Drive System, filed Mar. 10, 2004, assigned Ser. No. 10/797,717, which is hereby incorporated by reference as if fully set forth herein.

Figure 5:
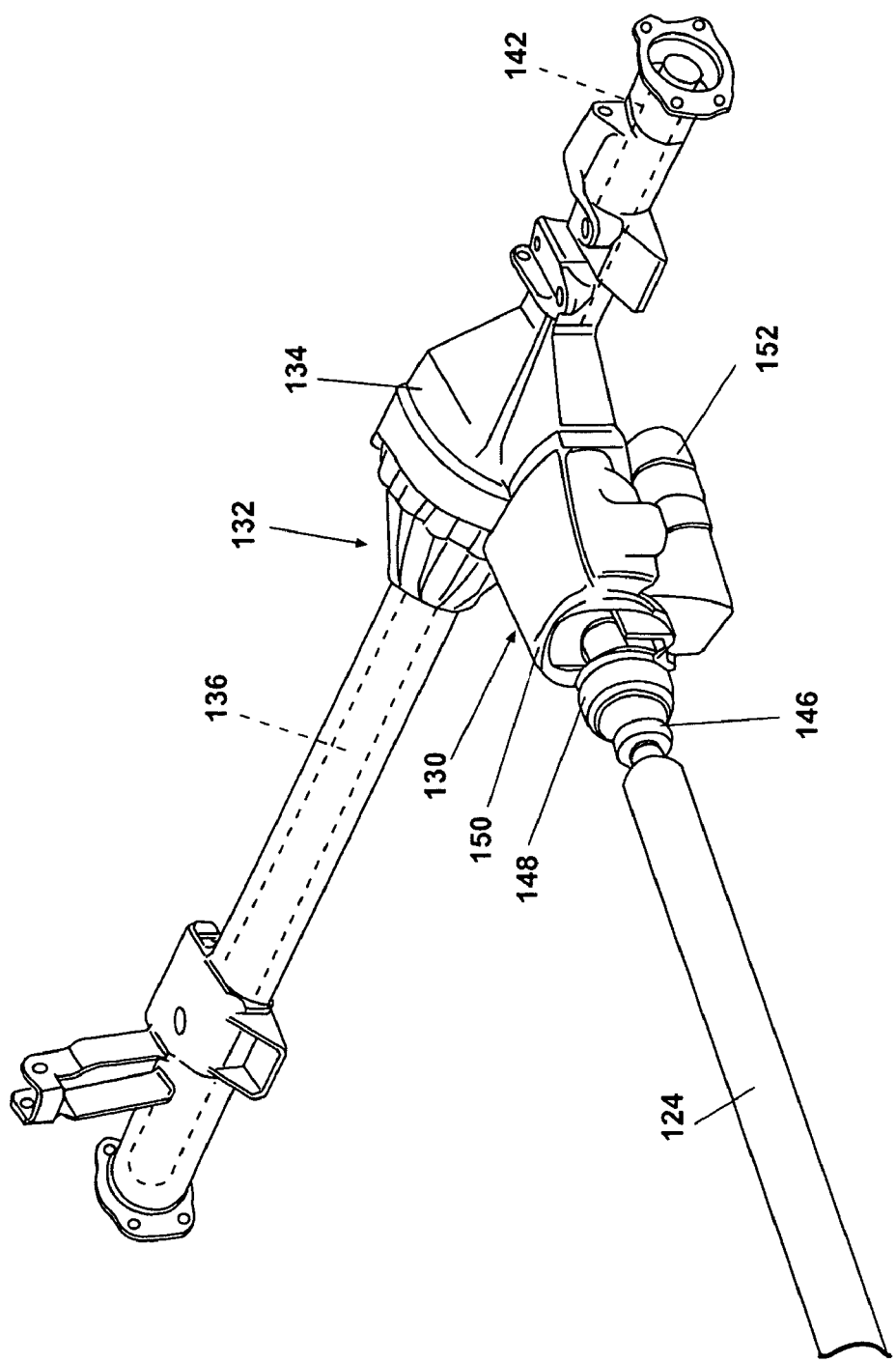
FIG. 5 is a perspective view of a rear axle assembly of FIG. 4 showing a drive unit directly mounted to a rear differential constructed in accordance with the teachings of the present invention.

With reference to FIG. 5, a first connector half 146, which is coupled to the prop shaft 124, can be coupled to a second connector half 148 that is associated with the drive unit 130 to facilitate the transmission of the drive torque from the prop shaft 124 to the drive unit 130. The drive unit 130 can include a housing 150 that can be connected to the housing of the rear axle 132 (as best seen in reference to FIG. 7). A shift unit 152 can be coupled to the housing 150. The drive torque can be transmitted via the drive unit 130 through the rear axle 132 to the rear wheel set 140 (shown in FIG. 4). The shift unit 152 can include an electrical actuator that can be operated, for example, from an electric power source commonly provided by the vehicle 102. An exemplary shift unit is commercially available from the Joseph Pollak Corporation of Boston, Mass. The shift unit 152 can include a linear actuator (not shown) which translates a shift fork 154 (described in further detail in reference to FIG. 6). Shifting of the shift unit 152 is not limited to a linear actuator and can also be accomplished using a solenoid operator, a vacuum diaphragm, a hydraulic operator, a cable or similar suitable device.

Figure 6:
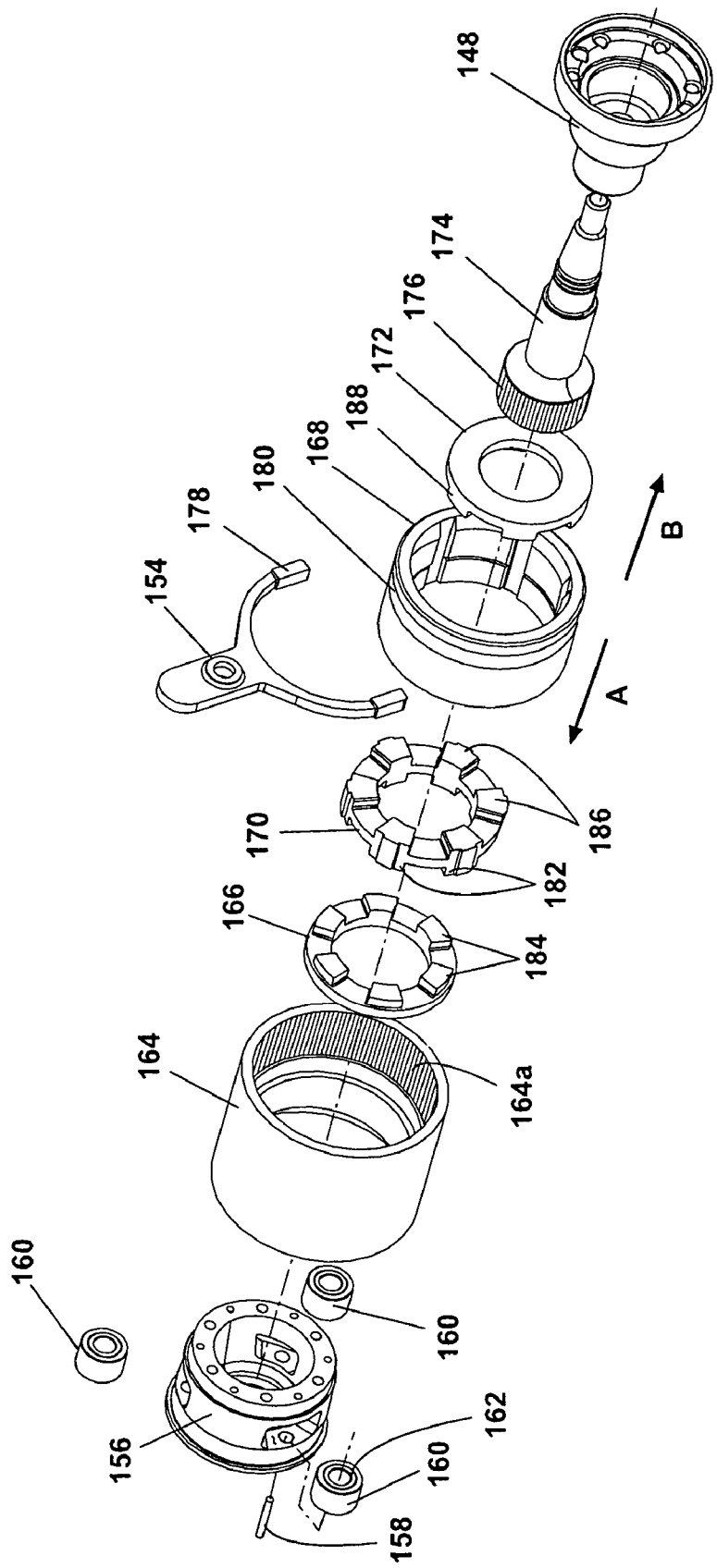
FIG. 6 is an exploded assembly view of the drive unit of FIG. 5.

With reference to FIG. 6, the drive unit 130 can include a planet carrier 156. The planet carrier 156 includes a plurality of pins 158, each supporting one of a plurality of planet gears 160 on a bearing 162. The planet carrier 156 can rotate within a ring gear 164. A first clutch ring 166 can be coupled for rotation with the planet carrier 156. The first clutch ring 166 can be connected by a plurality of fasteners (not shown) or otherwise suitably connected to the planet carrier 156.

A shift collar 168 can meshingly engage the ring gear 164 and can translate in either a shift direction "A" or a shift direction "B" within the ring gear 164. A second clutch ring 170 can be fixedly connected to an interior surface of the shift collar 168, for example by welding or other suitable fastening techniques. A third clutch ring 172 can be fixedly coupled for rotation with the second connector half 148. A sun gear shaft 174 can be coupled for rotation with the second connector half 148 and can be disposed through each of the third clutch ring 172, the shift collar 168, the second clutch ring 170, the first clutch ring 166, the ring gear 164, and the planet carrier 156, where a sun gear 176 of the sun gear shaft 174 meshingly engages the plurality of the planet gears 160. The shift fork 154 can have a pair of tines 178 that can be disposed in an annular channel 180 of the shift collar 168 such that displacement of the shift fork 154 by the shift unit 152 causes the shift collar 168 to translate in either of shift direction "A" or shift direction "B", as shown in FIG. 6.

The shift fork 154 can be displaced in shift direction "A" to translate the shift collar 168 and the second clutch ring 170 into a position wherein a plurality of clutch teeth 182 of the second clutch ring 170 engage a plurality of clutch teeth 184 of the first clutch ring 166. Displacement in shift direction "A" locks the ring gear 164 to the planet carrier 156 to facilitate torque transmission between the second connector half 148 and the planet carrier 156 in a high range or relatively high speed ratio. Displacement in shift direction "A", therefore, results in rotation of each of the planet carrier 156, the ring gear 164 and the sun gear shaft 174, without relative motion between one another.

Figure 12:
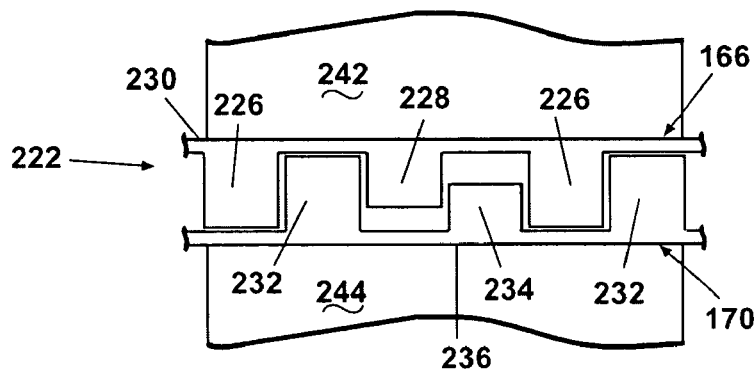

The shift fork 154 can also be displaced in shift direction "B" to translate the shift collar 168 and the second clutch ring 170 into a position where a plurality of clutch teeth 186 on an opposite side of the second clutch ring 170 engage a plurality of clutch teeth 188 on the third clutch ring 172. In this position, the ring gear 164 is locked in a stationary condition that permits the planet gears 160 to perform a speed reduction and torque multiplication operation so that the drive torque is transmitted between the second connector half 148 and the planet carrier 156 in a low range, or relatively low speed ratio. It will be appreciated that in various alternative embodiments, the first clutch ring 166 can connect with the third clutch ring 172 thus omitting the second clutch ring 170. It will be further appreciated that the first clutch ring 166 and the third clutch ring 172 or combinations thereof can be applied in myriad applications that necessitate connection and disconnection of two members, an example of which is illustrated in FIG. 12.

Figure 7:
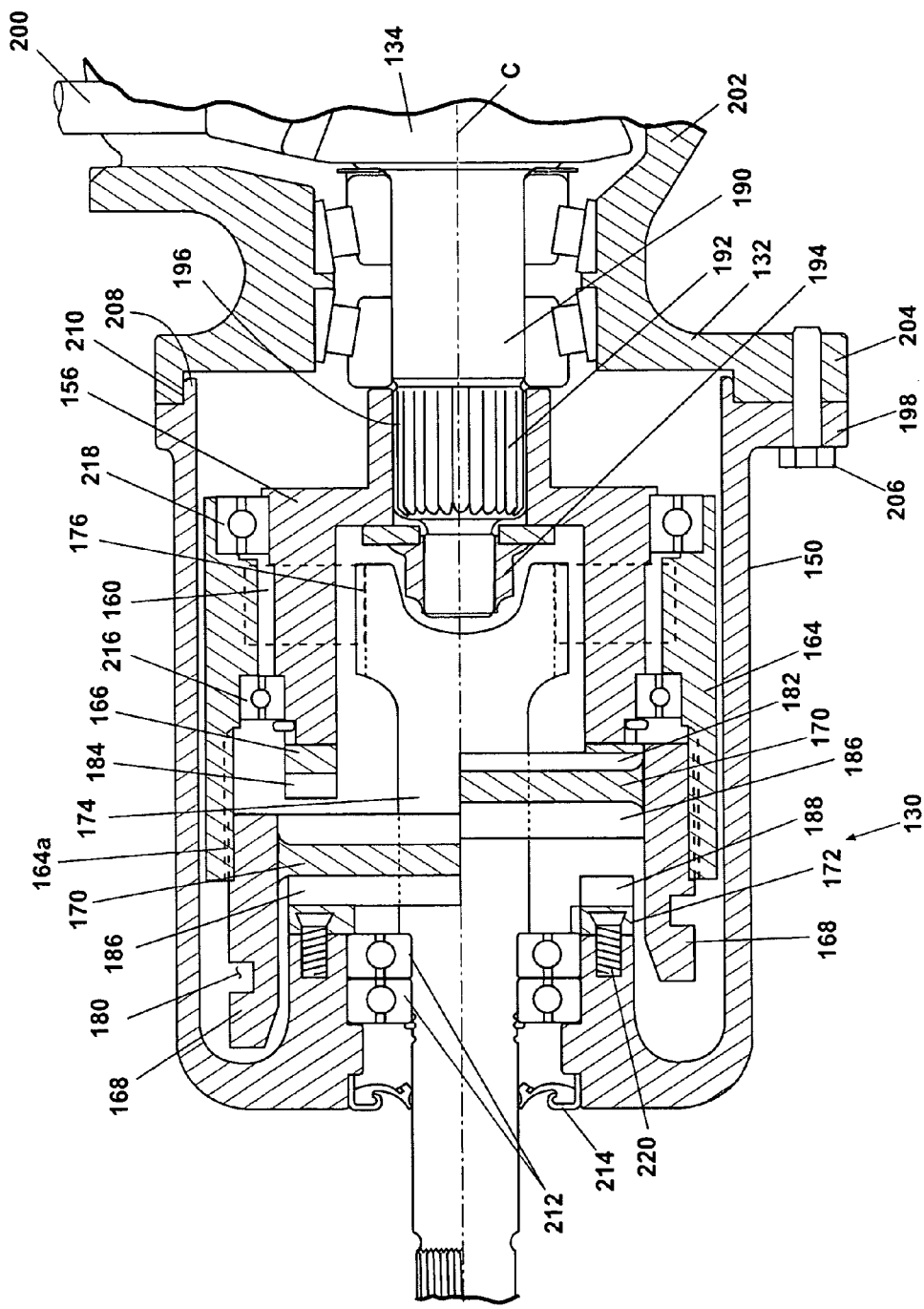
FIG. 7 is a cross-sectional view of the drive unit of FIG. 6 showing a high range configuration and a low range configuration.

In reference to FIG. 7, the rear axle 132 (FIG. 5) can include an input pinion 190, which can have a splined input shaft 192, that transmits the drive torque to the differential 134 (FIG. 5) in a manner that is well known in the art. Briefly, the input pinion 190 can transmit the drive torque to a ring gear (not shown) of the differential 134, which causes the differential 134 to rotate within the housing of the rear axle 132. A gear set (not shown), which can include a pair of side gears (not shown) and a plurality of pinions (not shown), can be employed to transmit the drive torque to the left and right axle shafts 136 and 142 (FIG. 5). A fastener 194, such as a nut or a bolt, can be employed to fixedly, but removably couple the planet carrier 156 (FIG. 6) to the input shaft 192. The input shaft 192 can meshingly engage a mating internally splined portion 196 of the planet carrier 156. The housing 150 can include a housing flange 198. An axle 200 can be rotatably connected within a differential housing 202 that can include a differential flange 204. The housing flange 198 and the differential flange 204 are fixedly, but removably coupled together using a plurality of fasteners 206. The housing 150 can also include a pilot feature 208 that slidably engages a mating feature 210 of the differential flange 204, so as to permit various components of the drive unit 130 and the rear axle 132 to be aligned about a common centerline indicated by the letter "C".

The sun gear shaft 174 can be rotatably supported within the housing 150 along common centerline "C" by a bearing set 212. A shaft seal 214 can be employed to seal a junction between the sun gear shaft 174 and the housing 150. The sun gear 176 on the sun gear shaft 174 meshingly engages the plurality of the planet gears 160. The planet gears 160, in turn, rotatably engage an internally toothed surface 164a (FIG. 6) of the ring gear 164. The ring gear 164 is rotatably supported on an outer diameter of the planet carrier 156 by a first bearing 216 and a second bearing 218. A plurality of fasteners 220 can be employed to couple the third clutch ring 172 to a portion of the housing 150.

FIG. 7 shows a configuration for the drive unit 130 during the high range or high speed mode condition of operation in a portion of the drive unit 130 below common centerline "C". The low range or low speed mode of operation configuration is shown above common centerline "C". In the high range operating condition, the shift collar 168 is shifted such that the second clutch ring 170 and the first clutch ring 166 engage together. In this condition, the plurality of the clutch teeth 182 on the second clutch ring 170 engages with the plurality of the clutch teeth 184 on the first clutch ring 166 such that the drive torque received via the sun gear shaft 174 is transferred via the planet gears 160 to the ring gear 164 and from the shift collar 168 to the planet carrier 156. The planet carrier 156 thereby transmits drive torque in the high range via the input pinion 190 to the differential 134.

In the low range or the low speed mode of operation shown above common centerline "C" in FIG. 7, the shift collar 168 is displaced to the left as shown in FIG. 7, which causes the clutch teeth 186 of the second clutch ring 170 to engage the respective clutch teeth 188 of the third clutch ring 172. Because the third clutch ring 172 is fixedly engaged to the housing 150, the ring gear 164 is thereby grounded via the shift collar 168 to the housing 150 and cannot rotate. The drive torque from the sun gear shaft 174 is therefore transferred in the low range via the sun gear 176 to the planet gears 160 and directly to the planet carrier 156 such that the planet carrier 156 is driven at a predetermined speed ratio relative to the sun gear 176, such as, but not limited to, a 1:3 ratio.

Figure 8:
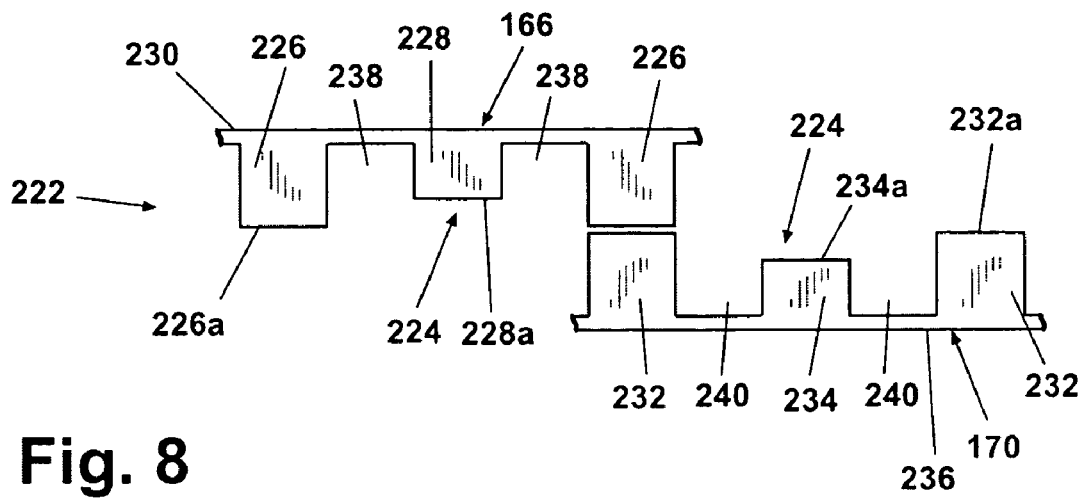
FIGS. 8-12 are side views of a first clutch ring and a second clutch ring of a positive clutch constructed in accordance with the teachings of the present invention further showing the progression of rotation, connection and engagement of each side of the positive clutch.
Figure 9:
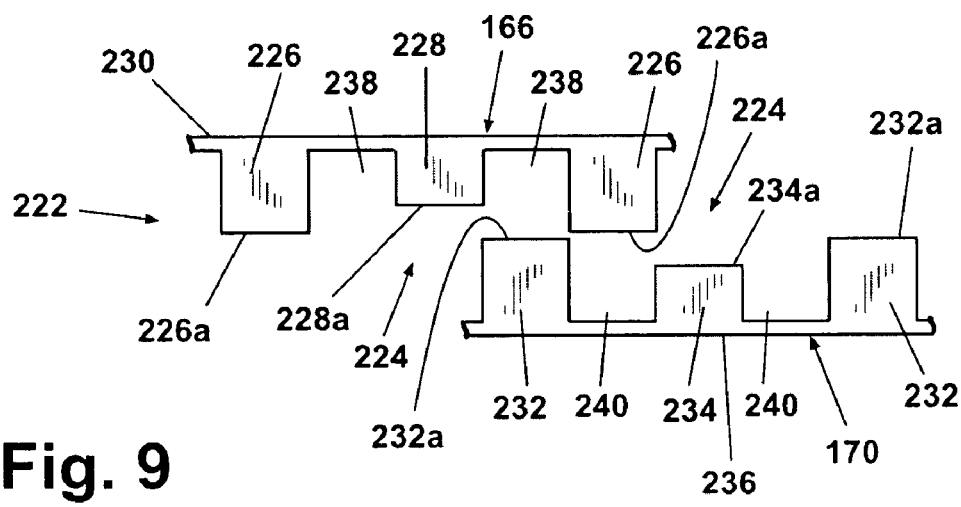

With reference to FIGS. 8-12, portions of the first clutch ring 166 and the second clutch ring 170 are shown such that the progressive meshing of the two clutch rings 166, 170 can be seen. It will be appreciated that in FIGS. 8-12, only portions of the first clutch ring 166 and the second clutch ring 170 are illustrated, such that only three teeth are shown for the first clutch ring 166 and the second clutch ring 170 respectively. It will be further appreciated that one or both of the first clutch ring 166 and the second clutch ring 170 may be biased toward the opposed clutch ring by either an electric actuator, a spring or other suitable device. As can be seen in FIG. 8, the first clutch ring 166 is out of alignment with the second clutch ring 170 such that engagement of a positive clutch 222 cannot occur unless the first clutch ring 166 or the second clutch ring 170 is rotated relative to the opposed clutch ring. As shown in FIG. 9, the first clutch ring 166 or the second clutch ring 170 continues to rotate relative to another. It will be additionally appreciated that the clutch will continue to rotate until the first clutch ring 166 meshes with the second clutch ring 170, as shown in FIG. 12. Moreover, the first clutch ring 166 and the second clutch ring 170 can rotate relative to one another to engage the positive clutch 222 in either a clockwise or a counter-clockwise direction.

To facilitate meshing of the positive clutch 222, the first clutch ring 166 and the second clutch ring 170 have staggered tooth height configurations generally indicated by reference numeral 224. The first clutch ring 166 can include a plurality of first teeth 226 and a plurality of second teeth 228 connected to a first backing 230. Each second tooth 228 is shorter than the first teeth 226 between which it sits. The second clutch ring 170 can have a plurality of third teeth 232 and a plurality of fourth teeth 234 connected to a second backing 236. Similar to the first clutch ring 166, each fourth tooth 234 is shorter than the third teeth 232 between which it sits.

Figure 13:
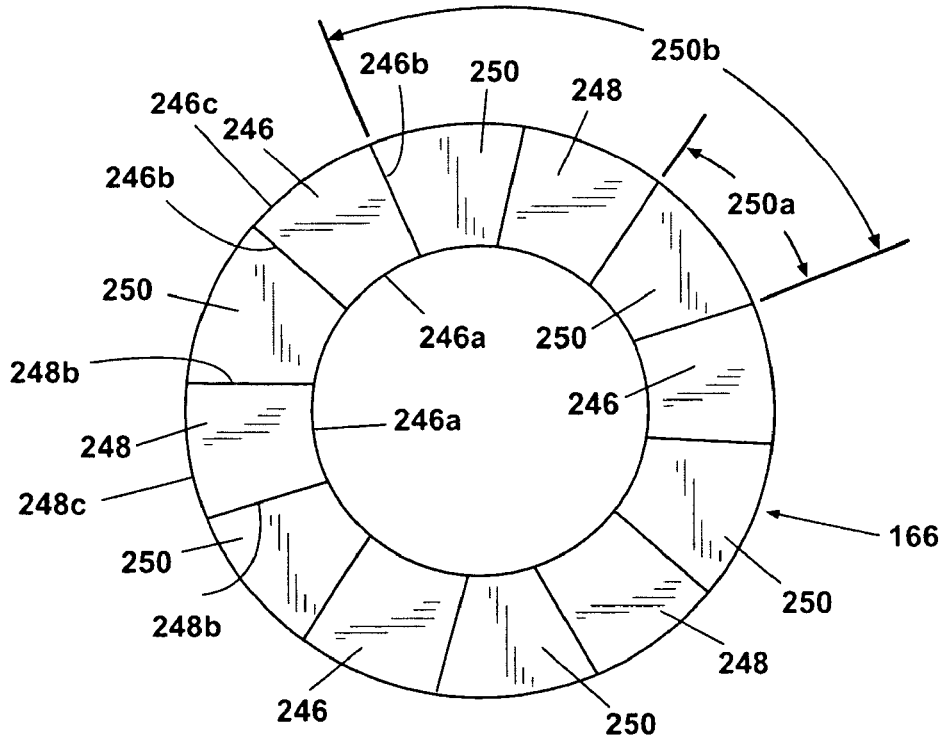
FIG. 13 is a simplified front view of the first clutch ring constructed in accordance with the teachings of the present invention.

First clutch ring spaces 238 formed on the first backing 230 are disposed between the teeth 226, 228 of the first clutch ring 166. Similarly, second clutch ring spaces 240 formed on the second backing 236 are disposed between the teeth 232, 234 of the second clutch ring 170. It will be appreciated that with the first clutch ring 166 and the second clutch ring 170, as illustrated in FIGS. 8-12, the teeth 226, 228, 232 and 234 are shown as only exemplary portions of the otherwise complete clutch rings 166, 170, as illustrated in FIGS. 6 and 13.

With continuing reference to FIGS. 8-12, the first clutch ring 166 can be moved relative to the second clutch ring 170 to engage the two rings 166, 170. In FIG. 8, an end face 226a of one of the first teeth 226 makes contact with an end face 232a of one of the third teeth 232. In this position, the positive clutch 222 is unable to engage. The first clutch ring 166 and the second clutch ring 170, therefore, must continue to rotate relative to one another. In FIG. 9, one of the third teeth 232 has continued to rotate beyond one of the first teeth 226. The positive clutch 222 may attempt to engage in this position, but in most instances, the rotational forces on the first clutch ring 166 or the second clutch ring 170 will prevent engagement so that the clutch rings 166, 170 will continue to rotate.

Figure 10:
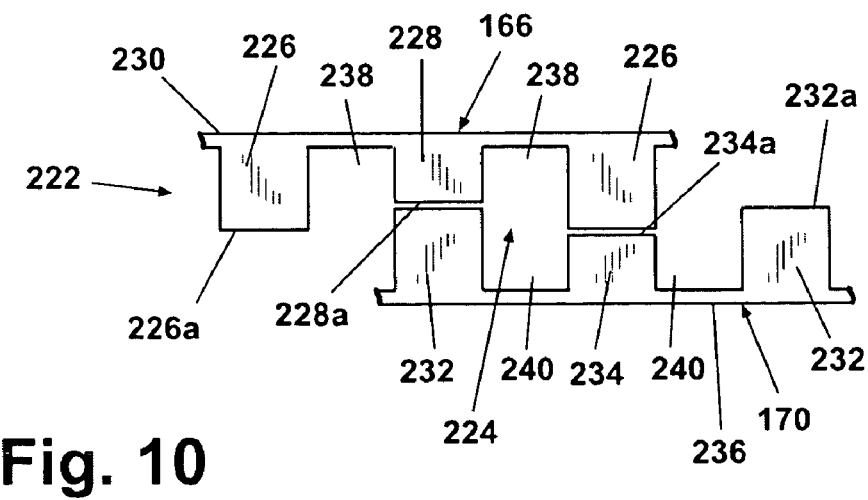

With reference to FIG. 10, the first clutch ring 166 continues to move relative to the second clutch ring 170. The end face 232a of one of the third teeth 232 comes into contact with an end face 228a of one of the second teeth 228. Moreover, an end face 234a of one of the fourth teeth 234 comes into contact with the end face 226a of one of the first teeth 226. It will be appreciated that in this instance, the positive clutch 222 is still unable to engage and the first clutch ring 166 continues to rotate relative to the second clutch ring 170.

Figure 11:
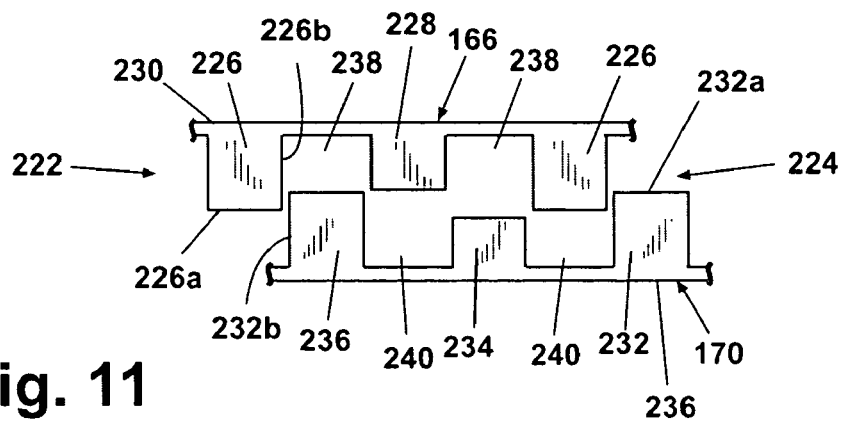

With reference to FIG. 11, one of the third teeth 232 has advanced past one of the second teeth 228 such that a side 232b of one of the third teeth 232 makes contact with a side 226b of one of the first teeth 226. It will be appreciated that in this instance the first clutch ring 166 is no longer able to move relative to the second clutch ring 170 because of the interference between one of the first teeth 226 and one of the third teeth 232. Moreover, one or both clutch rings 166, 170 are biased toward the opposed clutch ring, which further helps to bring the two rings 166, 170 into an engaged condition as shown in FIG. 12.

In FIG. 12, the positive clutch 222 is engaged. For example, a first member 242 is connected to the first clutch ring 166 and a second member 244 is connected to the second clutch ring 170. A rotational force transmitted through the first member 242 will be transmitted to the second member 244 through the positive clutch 222.

With reference to FIG. 13, it will be appreciated that the circular nature of the first clutch ring 166 lends itself to be described in radial coordinates. To that end, the teeth 226, 228 can encompass a circumferential spacing of about twenty-eight (28) degrees of the total clutch ring circle respectively, while the spaces 238 therebetween can occupy a circumferential spacing of approximately thirty-two (32) degrees of the clutch ring circle indicated by reference numeral 245. Furthermore, both the taller teeth 226 and the shorter teeth 228 have an arc shape. More specifically, the taller teeth 226 have two curved sides 246 and two straight sides 226b. Similarly, the shorter teeth 228 have two curved sides 248 and two straight sides 228b.

Figure 2:
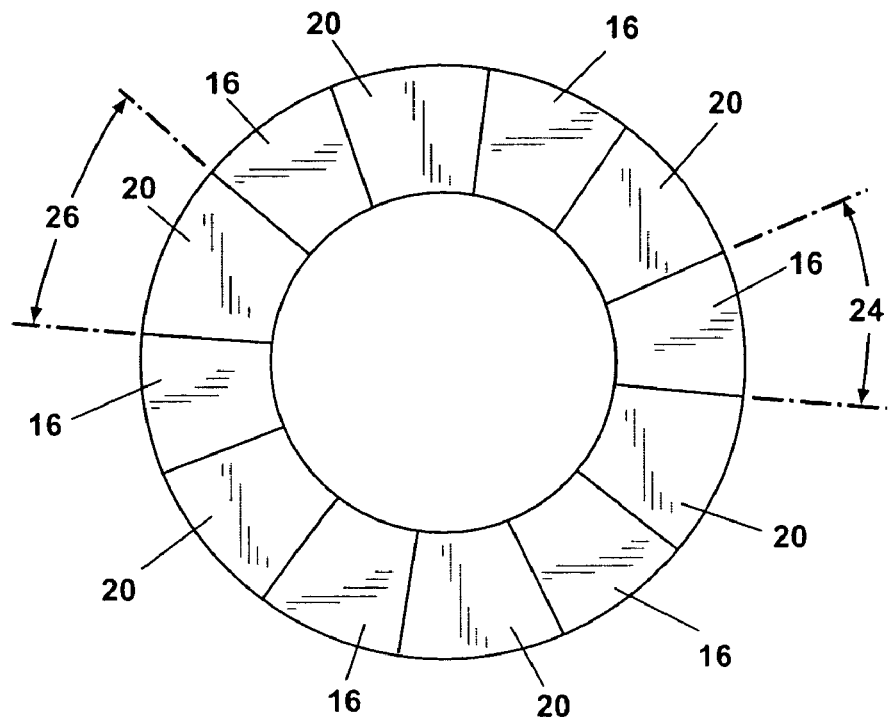
FIG. 2 is a front view of the first clutch ring of FIG. 1 showing a plurality of clutch teeth and spaces therebetween.
Figure 3:
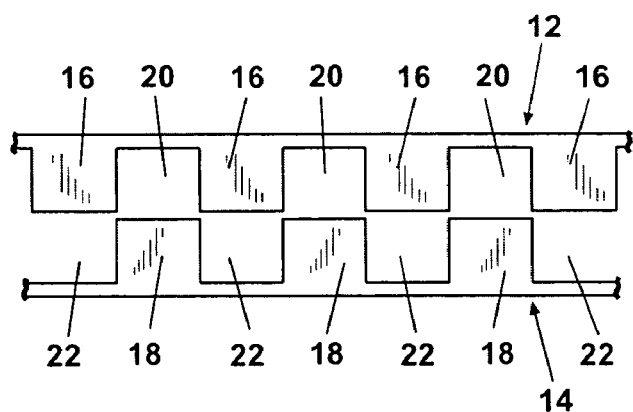
FIG. 3 is a side view of the first clutch ring and the second clutch ring of FIG. 1 positioned to be meshed together.

If the first clutch ring 166 was configured similar to the conventional clutch ring as shown in FIG. 2, the spaces 238 would provide an engagement slot into which a tooth of an opposing clutch ring would fit. In the conventional clutch example of FIG. 2, the engagement slot would be approximately thirty-two (32) degrees. In the present invention, however, the engagement slot is effectively enlarged, such that the engagement slot is enlarged to ninety-two (92) degrees as indicated by reference numeral 250 in the example provided.

The enlarged engagement slot 250 is operable because the taller teeth of each opposed clutch ring make contact (for example, the taller teeth 226, 232 of the first clutch ring 166 and the second clutch ring 170 respectively) and continue to rotate past one another. In addition, the first clutch ring 166 or the second clutch ring 170 advances closer to the opposed clutch ring thus closing the distance between the first clutch ring 166 and the second clutch ring 170. At this point, the taller teeth 226, 232 can either mesh in the space immediately adjacent to the tooth or continue to rotate and thus make contact with the next shorter tooth (for example one of the teeth 228 of the first clutch ring 166 in FIG. 8).

Figure 1:
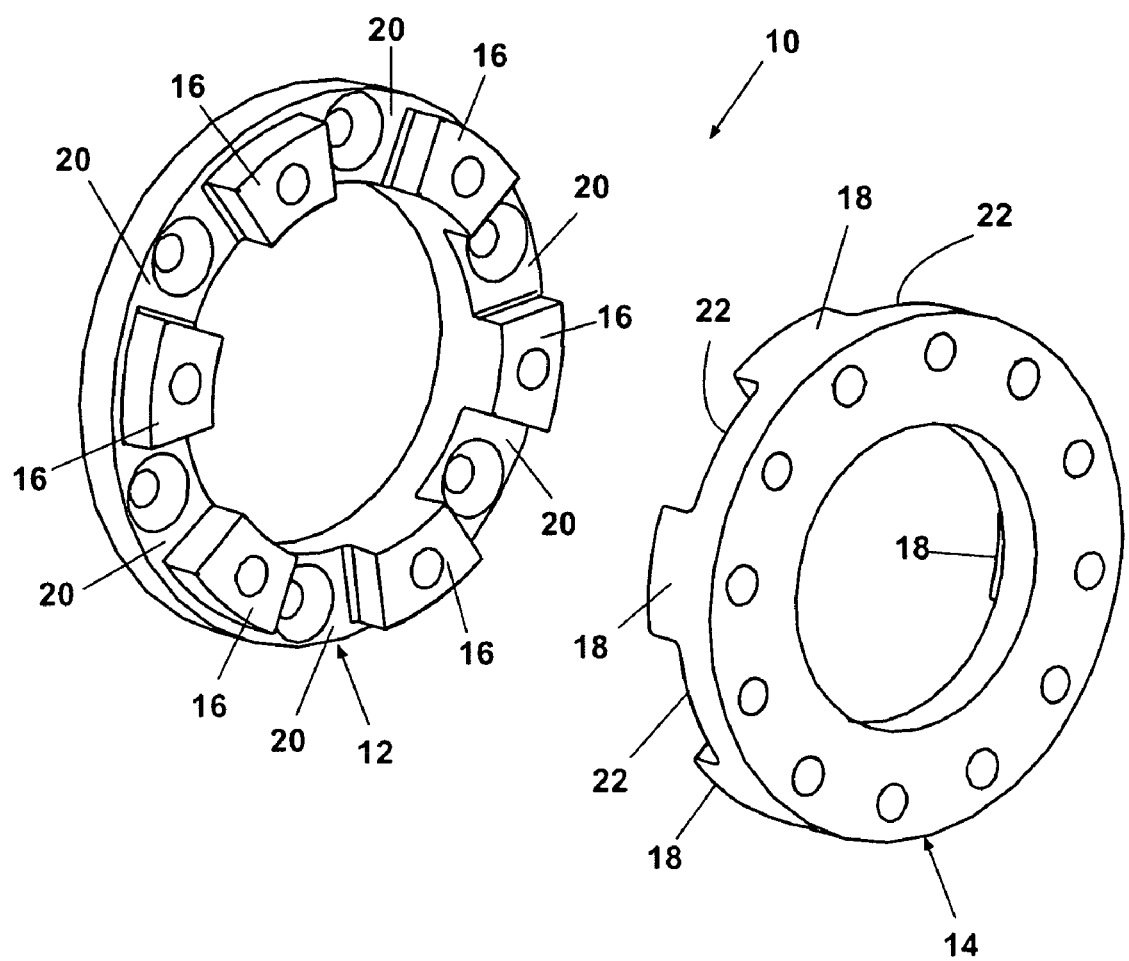
FIG. 1 is a perspective view of a conventional first clutch ring and a conventional second clutch ring of a conventional positive clutch.

Once the taller tooth advances beyond the shorter tooth of an opposed clutch ring, the taller tooth will encounter the side of the next taller tooth of the opposed clutch ring. Because the first clutch ring 166 and the second clutch ring 170 are biased toward one another interference between the teeth forces the positive clutch 222 to engage. The positive clutch 222 engages because the taller tooth can no longer rotate beyond the opposed taller tooth into which it has come in contact. Therefore, the opposed clutch ring accelerates to the rotational speed of the first clutch ring and thus the positive clutch meshes as shown in FIG. 12. In contrast, in the conventional positive clutch 10 (FIG. 1) the tooth must enter the engagement slot 26 (FIG. 2) or miss the engagement slot 26 and wait until the next engagement slot 26 rotates underneath.

As explained earlier, the engagement slot is larger than the tooth to promote engagement of the tooth into the engagement slot. For example, the engagement slot 26 (FIG. 2) can occupy thirty-two (32) degrees of the circular clutch ring while a tooth can occupy twenty-eight (28) degrees. With that example, there are four (4) degrees of total gap between a tooth and the engagement slot. This four (4) degree wide gap is referred to as lash or clearance. In the present invention, the lash and the clearance can be reduced because the teeth of the clutch ring need not enter the engagement slot in the manner required in the conventional positive clutch 10. Reduction of clearance or lash improves noise and vibration generation due to the gap between the tooth and the bigger engagement slot. Moreover, noise and vibration are further reduced because the first clutch ring need only rotate beyond a first tall tooth and shorter tooth set before engagement thereof. In contrast, the conventional positive clutch 10 must continue to rotate until the tooth enters the engagement slot and meshes.

Figure 14:
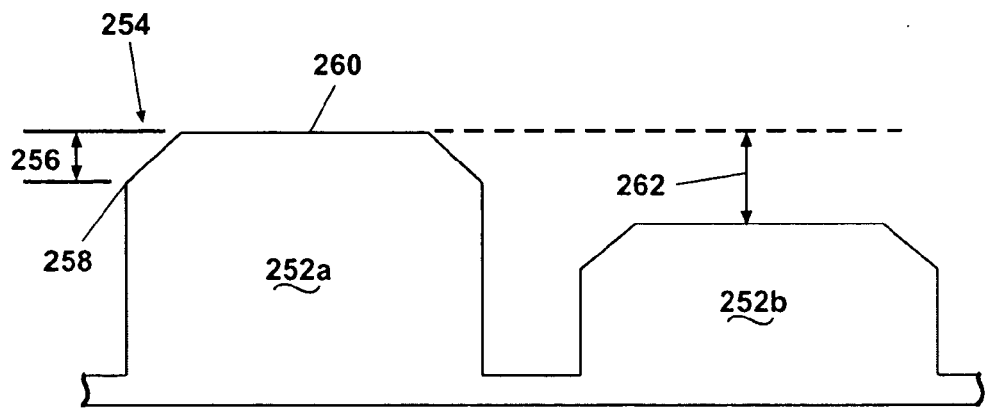
FIG. 14 is a front view of a clutch tooth constructed in accordance with the teachings of the present invention showing an edge treatment.
Figure 15:
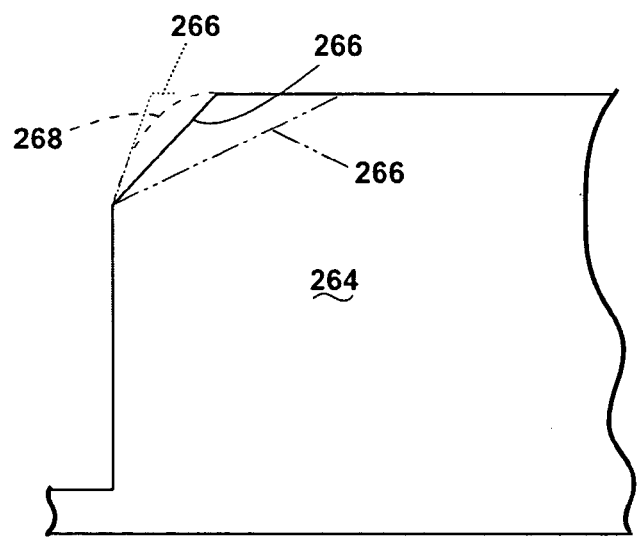
FIG. 15 is a front view of the clutch tooth of FIG. 14 showing various alternative edge treatments.

With reference to FIG. 14, an exemplary tooth from either the first clutch ring 166 or the second clutch ring 170 is shown and indicated by reference numeral 252a. The tooth 252a has edge treatments indicated by reference numeral 254. The edge treatments 254 can include chamfering or rounding to a predetermined radius. Whether the edge treatments 254 include chamfering, radiusing, beveling or other suitable edge treatments, the edge treatments 254 include an edge treatment height indicated by reference numeral 256. It will be appreciated that the edge treatment height is defined by the distance from the beginning of the edge treatment 254 indicated by reference numeral 258 to a top 260 of the tooth 252. With that in mind, a height difference 262 between the taller tooth 252a (for example one of the first teeth 226 in FIG. 8) and a shorter tooth 252b (for example, one of the teeth 228 in FIG. 8) is greater than about 2 times the edge treatment height 256. (i.e., the height difference 262≧about 2×(the edge treatment height 256)). In FIG. 15, the edge treatments 254 are shown on an exemplary clutch tooth 264 in various configurations. To that end, the edge treatments 254 can include chamfering at various angles 266, rounded edges 268, and beveling in various configurations.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A drive train for a vehicle, the drive train comprising:
an axle having an axle housing, a differential assembly and a pair of axle shafts, the differential assembly including an input pinion and a differential, the differential being rotatably disposed in the axle housing, the axle shafts being coupled to opposite sides of the differential for rotation therewith; and
a drive unit including a drive unit housing, an input shaft, a planetary transmission and a clutch, the drive unit housing being mounted on the axle housing and defining a cavity, the input shaft being received in the cavity and supported for rotation by the drive unit housing, the planetary transmission including a sun gear, a plurality of planet gears, a planet carrier and a ring gear, the sun gear being driven by the input shaft, the planet gears being supported by the planet carrier and meshingly engaging the sun gear and the ring gear, the ring gear being rotatable about the planet carrier, the planet carrier being rotatably coupled to the input pinion, the clutch having a first dog clutch and a second dog clutch, the first dog clutch including a first clutch portion and a first intermediate clutch portion, the second dog clutch including a second intermediate clutch portion and a second clutch portion, the first and second intermediate clutch portions being disposed between the first and second clutch portions, the first clutch portion having a first tooth set and being coupled to the drive unit housing, the second clutch portion having a second tooth set and being coupled to the planet carrier, the first intermediate clutch portion having a first intermediate tooth set, the second intermediate clutch portion having a second intermediate tooth set, the first and second intermediate tooth sets being non-rotatably but axially movably coupled to the ring gear, the first and second intermediate clutch portions being axially movable between a first position, in which the first intermediate tooth set matingly engages the first tooth set to non-rotatably couple the ring gear to the drive unit housing, and a second position in which the second intermediate tooth set matingly engages the second tooth set to rotatably couple the ring gear to the planet carrier;

wherein at least one of the first tooth set, the second tooth set, the first intermediate tooth set and the second intermediate tooth set includes a plurality of first teeth and a plurality of second teeth that are taller than the first teeth in an axial direction.

2. The drive train of claim 1, wherein the first teeth include an edge having an edge treatment including a predetermined edge treatment height.

3. The drive train of claim 2, wherein the edge treatment is a chamfer.

4. The drive train of claim 2, wherein the edge treatment is a radius.

5. The drive train of claim 2, wherein the first teeth are taller than the second teeth by an amount that is at least twice the edge treatment height.

6. The drive train of claim 2, wherein a top of the first teeth is parallel to a top surface of the second teeth.

7. A drive train for a vehicle, the drive train comprising:
an axle having a differential, the differential including an input pinion; and
a drive unit having a housing, an intermediate shaft, a planetary transmission and a clutch, the housing including a cavity in which the intermediate shaft, the planetary transmission and the clutch are disposed, the intermediate shaft being adapted to be coupled to a prop shaft, the planetary transmission coupling the intermediate shaft and the input pinion, the clutch including a plurality of clutch rings, at least one of the clutch rings having a first set of teeth and a second set of teeth that are shorter than the first set of teeth;
wherein the clutch is operable in a first mode, wherein a first pair of the clutch rings are engaged to one another to couple the intermediate shaft and the input pinion for rotation with one another, and wherein the clutch is operable in a second mode wherein a second pair of the clutch rings are engaged to one another to provide the speed reduction between the intermediate shaft and the input pinion.

8. The drive train of claim 7, wherein the clutch rings associated with at least one of the first pair of clutch rings and the second pair of clutch rings are formed with the first and second sets of teeth.

9. The drive train of claim 7, wherein a tooth of the second set of teeth is disposed between two teeth of the first set of teeth.

10. The drive train of claim 7, wherein a tooth of the first set of teeth includes an edge having an edge treatment including a pre-determined edge treatment height.

11. The drive train of claim 10, wherein the edge treatment is a chamfer.

12. The drive train of claim 10, wherein the edge treatment is a radius.

13. The drive train of claim 10, wherein the first set of teeth are taller than the second set of teeth by an amount that is at least twice the edge treatment height.

14. The drive train of claim 7, wherein a top of the first set of teeth is parallel with a top of the second set of teeth.

15. A drive train for a vehicle, the drive train comprising:
an axle having an axle housing and a differential that is received in the axle housing, the differential including an input pinion; and
a drive unit having a drive unit housing, an intermediate shaft, a transmission and a clutch, the drive unit housing being mounted to the axle housing and including a cavity in which the intermediate shaft, the transmission and the clutch are disposed, the intermediate shaft being adapted to be coupled to a prop shaft, the transmission coupling the intermediate shaft and the input pinion, the clutch including a first dog clutch and a second dog clutch, the first dog clutch having a first set of clutch teeth and a first set of mating clutch teeth that can be matingly engaged to the first set of clutch teeth, the second dog clutch having a second set of clutch teeth and a second set of mating clutch teeth that can be matingly engaged to the second set of clutch teeth, at least one of the first set of clutch teeth, the first set of mating clutch teeth, the second set of clutch teeth and the second set of mating clutch teeth having a plurality of first teeth and a plurality of second teeth that are shorter than the first teeth;
wherein the clutch is operable in a first mode, wherein the intermediate shaft and the input pinion are coupled for rotation with one another, and wherein the clutch is operable in a second mode wherein the transmission provides a speed reduction between the intermediate shaft and the input pinion; and
wherein a rotational axis of the input pinion is coincident with a rotational axis of the intermediate shaft.

* * * * *